March 3, 1964 R. A. BERGAN 3,123,739
METHOD AND APPARATUS FOR CONTROLLING A SEALED ATMOSPHERE
Filed Aug. 16, 1960 2 Sheets-Sheet 1

INVENTOR.
R. A. BERGAN
BY *Robert K. Schumacher*
ATTORNEY

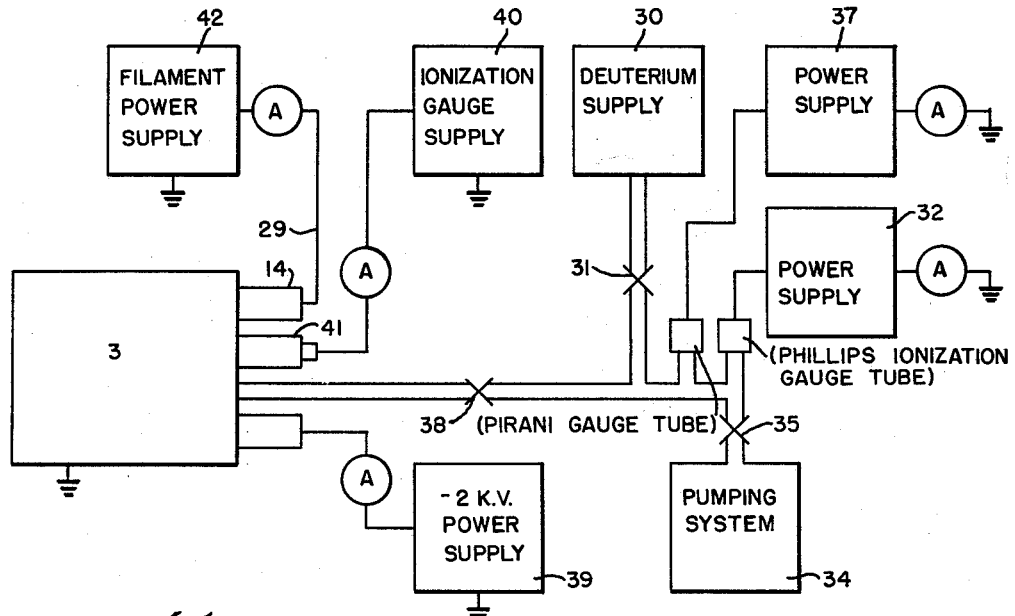
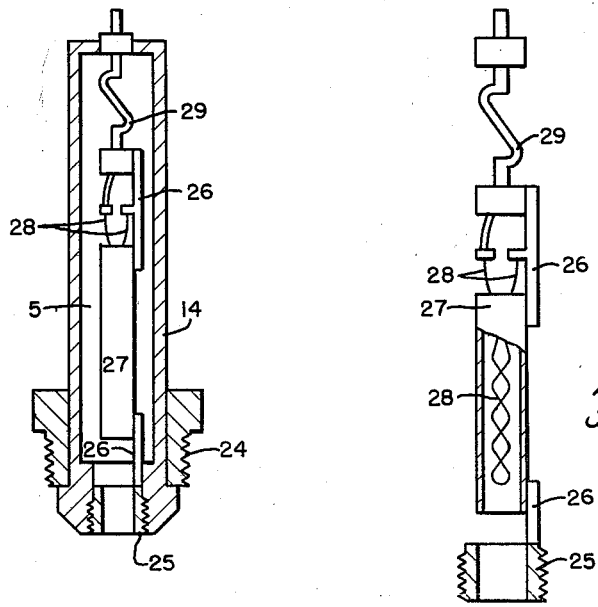

United States Patent Office 3,123,739
Patented Mar. 3, 1964

3,123,739
METHOD AND APPARATUS FOR CONTROLLING A SEALED ATMOSPHERE
Reuben A. Bergan, Tulsa, Okla., assignor to Well Surveys, Inc., a corporation of Delaware
Filed Aug. 16, 1960, Ser. No. 49,997
8 Claims. (Cl. 315—108)

This invention relates to the control of the atmosphere in an electric discharge tube, and more particularly to methods and apparatus for controlling the purity and density of the atmosphere in a sealed or static atmosphere ion accelerator tube employing the well known deuterium-tritium reaction to produce neutrons.

In radioactivity well logging, it has long been conventional to bombard earth formations surrounding a well with neutrons, and to record as a function of depth the neutrons scattered by the formations, or to similarly record the gamma rays produced in the formations by the neutron bombardment. Originally, the neutron sources in such logging consisted of a mixture of radium and beryllium. Although such sources are generally satisfactory for some purposes, and in fact are still widely used, the gamma rays emitted in large quantity with the neutrons frequently obscure the measurement of the gamma rays induced in the bombarded formations by the neutrons. Moreover, safety and economy requirements necessarily provide a limit to the intensity of such sources when used for well logging purposes. In addition, the relatively low energy of neutrons emitted by radium-beryllium sources limits the depth of formation penetration by the neutrons, and thus limits the lateral depth of investigation. Moreover, radium-beryllium sources simultaneously emit neutrons of various energies. Since spectral analysis of scattered neutrons returning from the bombarded formations is best achieved with a mono-energetic neutron source, radium-beryllium sources are unsatisfactory for the making of this particularly useful measurement.

To overcome these disadvantages, other "natural" neutron sources such as polonium-beryllium, plutonium-beryllium, and actinium-beryllium mixtures have been developed. Some of these neutron sources are comparatively gamma-free. However, since they are natural sources they cannot be "turned off," or pulsed, in any manner except by the interposition of substantial shielding, and thus are subject to the aforementioned limitations of economy and safety.

It was to avoid these difficulties and limitations that the static atmosphere ion accelerator was developed and combined with an electrostatic generator. This device, the principles of which are described in U.S. Letters Patent No. 2,689,918, issued September 21, 1954, to Arthur H. Youmans, provides an almost completely mono-energetic and gamma-free supply of neutrons of about 14 mev. energy. Such a device can also be pulsed or turned off as desired. However, the static atmosphere ion accelerator or "accelerator tube," as it is more commonly called, is essentially designed and operated as a high vacuum electric discharge tube. It, therefore, is subject to the operating difficulties peculiar to this class of electronic equipment, particularly when subjected to the temperature and pressure extremes often encountered during well logging.

Basically, the accelerator tube comprises an ion producing region and an accelerating region. In the ion producing region a cathode and an anode are disposed in a deuterium atmosphere having a pressure of the order of $2 \times 10^{-3}$ mm. Hg. When the electrostatic generator applies a positive charge of sufficient magnitude (usually 1,000 to 2,000 volts) to the ion source to produce ionization of the intervening deuterium in the usual manner. A magnetic field is provided to deflect the electron flow, from cathode to anode, to lengthen the path of travel and thereby greatly increase the extent of ionization. The resulting deuterium ions, being positively charged, are attracted toward the cathode. The cathode, however, being constructed of open mesh or screen, is relatively transparent to the deuterium ions. Upon diffusing through the mesh cathode, the ions encounter a high voltage accelerating field between the ion producing region and "ground," and are accelerated to high energies before striking a tritium-impregnated target. The bombardment of the tritium nuclei, by the accelerated deuterium ions, produces neutrons having approximately 14 mev. energy by means of the well known deuterium-tritium reaction.

Since the electrostatic generator provides a constant current flow to the aforementioned anode, the voltage at the anode required to achieve the sought-for ionization is dependent upon the pressure of the atmosphere to be ionized. Moreover, it is also obvious that any impurities in the atmosphere will be also ionized when the electron flow occurs. Thus, a constant neutron output of high intensity and efficiency can only be achieved with an accelerator tube having an atmosphere approaching optimum pressure and purity. Only a very slight deviation from optimum is required to materially affect the performance of the accelerator tube as a neutron source for well logging purposes. Moreover, the substances constituting impurities are substances such as hydrogen, oxygen, nitrogen, carbon compounds, and water vapor. Many of the metals commonly used in the structure of the tube have a particular tendency to absorb (or adsorb) these impurities at certain temperatures and to desorb them at higher temperatures. Since the range of these temperatures is usually within the range of temperatures found in wells, it is often the case that an accelerator tube which operates satisfactorily at the surface of the earth, will operate imperfectly in the well. Such a case is especially true for tubes which have been operated for extended periods.

This "out-gassing" phenomenon is, of course, a characteristic of all high-vacuum electric discharge tubes, and need not be discussed at length. However, in addition to the aforementioned impurities tending to occur in all such tubes, the accelerator tube atmosphere also receives tritium from the target due to the bombardment by the deuterium ions. This tritium is ionized in the ion producing region and the resulting tritium ions are accelerated back into the target. Although they will produce neutrons if they strike deuterium nuclei in the target, they require much more energy (due to their relatively greater mass) to achieve the required speed. Moreover, since the tritium in the target greatly exceeds the deuterium, even after long operation of the tube, relatively few of the tritium ions will strike deuterium nuclei and the result will be ineffective except to waste substantial amounts of power. Since the size of the power supply is limited in well logging, loss of power is a critical factor. Limitations of space, as well as the fact that all sub-surface equipment must be remotely operated, serves to eliminate the usual methods and apparatus for controlling tube atmosphere pressure and purity. Moreover, because of the many other operating handicaps inherent and always present in well-logging, the usual methods of detecting and identifying the causes of tube malfunction are also unsuitable. Thus, due to these and other difficulties, the benefits to well-logging which are potentially available with the accelerator tube have not been fully realized.

These disadvantages are overcome with the present invention, and novel methods and apparatus are provided which establish the atmosphere, in the accelerator tube, at a constant pre-determined level of purity and pressure to thereby greatly improve the operation of the tube and to greatly extend its useful life as a mono-energetic and gamma-free source of high energy neutrons. The present invention makes use of the aforementioned affinity of metal for deuterium and for the aforementioned deleterious atmospheric constituents to remove such deleterious constituents from the deuterium atmosphere during tube operation, and to add or subtract deuterium to or from the atmosphere during tube operation to stabilize and control its internal pressure. The present invention also makes use of the finding that the magnitude of the current flowing through an auxiliary electrode, which electrode is located intermediate of the heretofore described ion producing region and the target, is functionally related to the condition of the tube atmosphere regardless of other tube operating factors. Thus, the current to this auxiliary electrode may be used to indicate the condition of the tube atmosphere, or may be used to control the operation of apparatus employing the previously described metallic affinity for deuterium and the aforementioned impurities to directly stabilize and control the tube atmosphere during logging operations. The atmosphere control apparatus, as hereinafter described, may be used independently of the electrode current without departing from the scope of the invention.

The advantages of the present invention are preferably attained by disposing in the tube atmosphere a single metal sleeve or tube partially saturated with a pre-determined amount of deuterium, and, by heating at least a section of this sleeve to peak temperature of about 900° centigrade (depending upon the type of metal composing the sleeve), to remove impurities from the atmosphere and simultaneously to remove or add deuterium from or to the atmosphere depending upon whether the atmosphere is excessively dense or sparse. Moreover, by continuing the heating of the sleeve at temperatures correlative to atmospheric fluctuations thereafter occurring (due to tube operation or changes in environmental conditions), the sleeve will be caused to function as a combination deuterium reservoir-sink to adjust and stabilize the atmospheric pressure as required. The heating means preferably used in the present invention is an electrically-powered heating filament disposed within the sleeve, and thus the heating of the sleeve can be achieved and controlled in several ways. In one very useful form of the present invention, as hereinafter described, a constant current of pre-selected magnitude is applied to the filament to heat at least a part of the sleeve to the minimum temperature at which the metal used to fabricate the sleeve will efficiently absorb impurities occurring in the atmosphere. If the accelerator tube atmosphere has been pre-established at approximately the pressure desired, the sleeve will getter (absorb and retain) all getterable impurities as they appear and will emit or desorb deuterium, depending upon the atmospheric pressure then existing, and depending upon the temperature of the sleeve. Of course, the sleeve is subject to changes in ambient temperature, as is the tube atmosphere and structure. However, if the filament current is of a sufficient magnitude, and if the sleeve is heated to a high gettering temperature, only the most extreme changes in ambient temperature will change the sleeve temperature sufficient to affect the sorption process.

In other forms of the present invention, which are especially useful under conditions requiring more precise control of the sorption process, the aforementioned auxiliary electrode current may be used, either directly or indirectly, in selecting the proper filament current. In the accelerator tube of this particular design there is disposed, intermediate the ionization region and the target, at least one ring-shaped electrode having the primary function of suppressing secondary electron emission from the target. When the atmosphere in the tube is at or near the optimum in operating pressure and purity, and when the tube is operating, a flow of current is developed in the "suppressor ring" circuit, as it is commonly called, which is small in proportion to the magnitude of the ion circuit. However, if impurities appear in the atmosphere, or if the pressure of the atmosphere changes from optimum, or if both situations develop, the suppressor current will be found to change correspondingly as a function of changes in tube atmospheric purity or pressure. If, instead, the pressure drops, then the suppressor current will decrease proportionately. Thus, during the processing of an accelerator tube, a comparison of the magnitude of the suppressor current with a supplemental pressure indication (provided by an ionization gage as hereinafter described) will within practical limits provide an immediate and accurate indication of the tube atmosphere. In the preferred forms of the present invention, at least a part of the sleeve is maintained at a gettering temperature during tube operation for well-logging purposes. When the present invention is used in the tube during well-logging, all suppressor current variations may be attributed to changes in pressure after the initial period of tube clean-up. Therefore, in one form of the present invention the logging operator need only adjust the filament current to compensate for pressure deviations indicated by variations in the suppressor current. In another useful form of the present invention, the suppressor current is itself used to modulate or control the temperature of the sleeve, and thus all necessary adjustments are made continuously, and as required, by changing conditions of tube operation and environment.

As previously stated, not all of the substances constituting impurities, and occurring from time to time in the tube atmosphere, are absorbable in a manner such that a reduction in sleeve temperature will not re-release them into the tube atmosphere. Although hydrogen and tritium are absorbable in the sleeve, as hereinafter described, they are also desorbable at certain temperatures. In the case of tritium, as before described, a constant emission into the atmosphere is produced by the bombardment of the target. To overcome this difficulty, inherent in an accelerator tube requiring a substantially pure deuterium atmosphere, it is preferable that the quantity of deuterium in the sleeve be many times the quantity of deuterium in the tube atmosphere. Thus, the mixtures of deuterium and tritium absorbed by the sleeve will always (within practical limits) consist of a much greater proportion of tritium than will the deuterium-tritium mixtures subsequently desorbed by the sleeve. When the atmosphere is held at optimum pressure, and the quantities of gas absorbed and desorbed are brought to equilibrium, the amount of tritium absorbed will still be many times greater than the amount of tritium desorbed. Thus, the so-called "non-getterable" impurities will be effectively removed by the sleeve by dilution, since, if the sleeve initially contains substantially only deuterium, the same process will also remove the hydrogen from the atmosphere. Of course, in those forms of the accelerator tube where the non-getterable gases do not constitute impurities, such as tubes containing pre-selected mixtures of deuterium and tritium, the sleeve need contain only enough of the gas mixture selected to provide a reserve against extraordinary operating demands.

In those forms of the present invention herein described, it is preferable that the sleeve be formed of titanium since this substance has been found to have the required ability to getter impurities, and to absorb and desorb deuterium satisfactorily for the purposes. Zirconium has also been found satisfactory, although its sorption characteristics are somewhat different for the purposes of the present invention. Of course, the sleeve may be formed of any metal capable of gettering, and also capable of sorption of hydrogen and its isotopes, to an extent substantially greater than the corresponding ability of the metals used in the structure of the tube. Thus the sleeve may be formed of tantalum, lanthanum, cerium, or uranium without departing from the scope of the present invention. Moreover, although it is preferred that the sorption device be in the form of a sleeve having a uniform wall thickness, and having the filament disposed inside to apply heat uniformly along its length, the "sleeve" may take the form of a rod, a wire, or even a strip, and the heating current may be applied directly to the sorption device or to a heating filament adjacently disposed. In addition, if a sleeve is used as the sorption device, it need not necessarily have a uniform wall thickness, since different effects and degrees of sorption and gettering may be obtained with sleeves of different shape without departing from the scope of the present invention.

Accordingly, it is an object of the present invention to provide novel methods and apparatus for stabilizing the performance of an electric discharge tube.

It is also an object of the present invention to provide in an electric discharge tube having an internal atmosphere composed substantially of a pre-selected gas selected from the group composed of hydrogen and its isotopes, in combination therewith a metallic sorption means disposed in contact with said atmosphere and containing said gas to the relative exclusion of other substances foreign to said sorption means, and means causing said sorption means to exchange with said atmosphere relative amounts of said gas functionally related to the pressure of said atmosphere.

It is also an object of the present invention to provide in an electric discharge tube having an internal atmosphere composed substantially of a gas selected from the group consisting of hydrogen and its isotopes, said tube having at least one electrode disposed adjacent said atmosphere and conducting an electric current of a magnitude predictably related to the pressure and purity of said atmosphere, in combination therewith a metallic body impregnated with said gas to the relative exclusion of other substances foreign to said body, said body being disposed in a manner such that said body absorbs impurities from said atmosphere and also exchanges with said atmosphere relative amounts of said gas functionally related to the pressure of said atmosphere and temperature of said body, and means responsive to the magnitude of said current for selectively heating at least a part of said body to maintain said atmosphere at a pre-selected pressure substantially to the exclusion of substances other than said gas.

It is also an object of the present invention to provide the method of maintaining in an electric discharge tube and at a pre-selected pressure a substantially pure atmosphere composed of a gas selected from the group consisting of hydrogen and its isotopes, said tube having in contact with said atmosphere a metallic tube impregnated substantially with a pre-determined amount of said gas to the relative exclusion of other substances foreign to said body, said method comprising heating at least a part of said body to a pre-selected temperature such that said body permanently absorbs permanently absorbable impurities from said atmosphere and absorbs and desorbs said gas respectively from and to said atmosphere in substantially equal amounts at said pre-selected pressure.

It is also an object of the present invention to provide the method of processing an electric discharge tube having an internal atmosphere composed substantially of a pre-selected gas selected from the group composed of hydrogen and its isotopes, said method comprising impregnating a metallic body with said gas to the relative exclusion of other substances, heating at least a part of said body in a manner and at a temperature such that said body permanently absorbs permanently absorbable impurities from said atmosphere and such that said body also exchanges with said atmosphere relative amounts of said gas functionally related to the pressure of said atmosphere, establishing said atmosphere at a pre-selected pressure, and sealing said tube when said exchanges of said gas substantially achieve equilibrium at said pre-selected pressure.

These and other objects and features of the present invention will be apparent from the following detailed description wherein reference is made to the figures of the accompanying drawings.

In the drawings:

FIG. 3 is a pictorial view of one form of the present invention.

FIG. 4 is a more detailed view of certain essential features of one form of the present invention.

FIG. 5 is a schematic diagram of apparatus found useful in processing an accelerator tube in accordance with the principles of the present invention.

Figure 1:
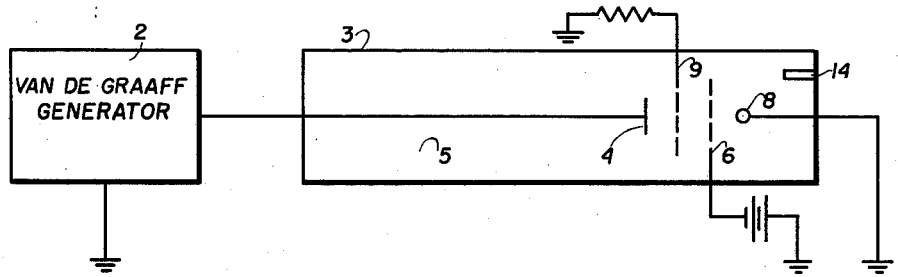
FIG. 1 is a schematic diagram of the accelerator tube and a continuous curent type of electrostatic generator when combined to function as a neutron source.

In those forms of the invention chosen for the purposes of illustration in the drawings, FIG. 1 shows functionally an electrostatic generator 2 of a type similar to that described in U.S. Patent 2,907,884, issued October 6, 1959 to A. J. Gale. The generator 2 is connected in a manner such that a positive charge is applied to the anode 4 of the accelerator 3. The positive potential on the anode 4 produces a cold emission from the cathode 9 which ionizes the deuterium atmosphere 5 between the anode 4 and the cathode. The positively charged deuterium ions are attracted to the cathode 9, and, since the cathode 9 is designed to be relatively transparent to the ions, pass through the cathode 9 and past an intermediate electrode 6 (which can be the previously mentioned suppressor rings) control electrode 6 to bombard the tritium-impregnated target 8. Those deuterium ions which strike tritium atoms in the target 8 may produce high energy neutrons as heretofore explained.

It is necessary, for maximum operating efficiency, to establish and maintain the deuterium atmosphere 5 within a pre-determined pressure range since, if the atmosphere is too dense, ionization will take place in the accelerating region, and if the pressure is too sparse, an injuriously high potential is required at the anode 4 to achieve the necessary ionizing current flow between the anode 4 and the cathode 9. Thus, it is preferable that the deuterium atmosphere 5 be maintained at a pressure such that the mean free path of the ions is at least as great as the distance between the cathode 9 and the target 8.

For conventional equipment of this type, when operated under conditions more favorable than those encountered in a borehole, pumping is usually employed to replace deuterium lost in the target 8 and to remove deuterium "de-gassed" from the structure (walls, electrodes, etc.) of the tube 3. However, such a remedy is impractical for well-logging purposes due to the necessity of remote operation and due to the limited space and power available. Moreover, as previously explained, the desorption of deuterium from the tube members is accompanied by desorption of other gases and substances constituting impurities since the power used to achieve this oinization and to accelerate the resulting foreign ions is completely wasted insofar as the production of neutrons is concerned. Insasmuch as available power is severely limited in a borehole, competition for the limited power is a critical difficulty.

Figure 2:
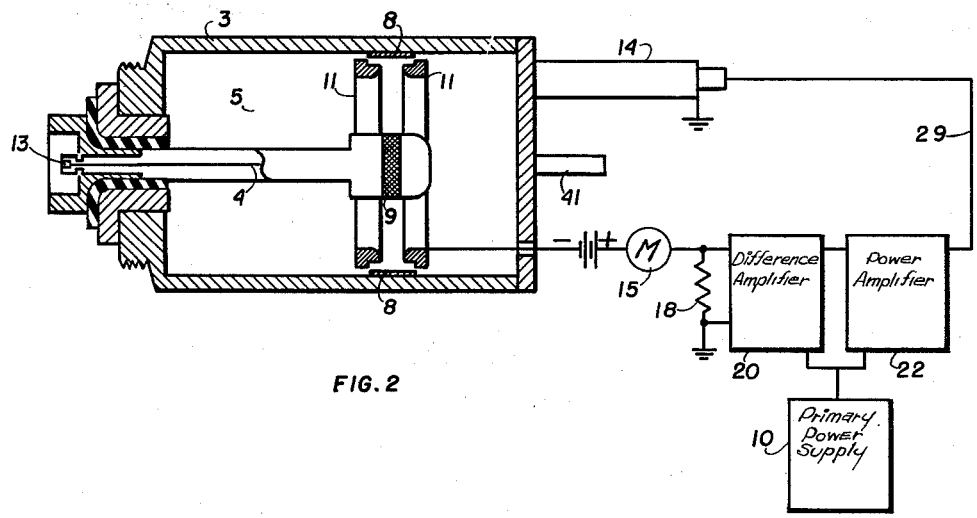
FIG. 2 is a simplified pictorial view of the accelerator tube, showing the relative position and appearance of basic structural members, and showing apparatus comprising one embodiment of the present invention.

In FIG. 2, in addition to a pictorial representation of the typical accelerator tube 3, there is shown one form of the present invention for establishing and maintaining a substantially pure deuterium atmosphere 5 therein at a pressure less than $10^{-2}$ mm. Hg. The tube 3 components depicted include a socket 13 for connecting the electrostatic generator 2 (appearing in FIG. 1 and omitted in FIG. 2 for the sake of simplicity) to the anode 4.

The mesh cathode 9 is shown surrounding the anode 4 which is usually formed from a single straight wire electrode. Surrounding the cathode 9 are the suppressor rings 11 which serve the control purposes performed in FIG. 1 by the intermediate electrode 6. Surrounding the entire complex of anode 4, cathode 9, suppressor rings 11, and intervening deuterium atmosphere 5, is the target 8. The meter 15 is included for the purpose of measuring the amount of current flowing in the suppressor ring 11 circuit (when the tube 3 is being operated) and through a load resistor 18. The voltage developed across the resistor 18 is applied to a difference amplifier 20 of standard design, and the output signal from the difference amplifier 20 is applied to a power amplifier 22. A primary power supply 10 is also shown for the purpose of energizing the difference and power amplifiers 20 and 22. In addition, there is shown attached at one end of the tube 3 a pressure jacket 14 which houses certain apparatus embodying essential features of the present invention.

FIG. 3 shows a cutaway pictorial view of the pressure jacket 14, and apparatus therein including a fitting 24 to attach the pressure jacket 14 to the accelerator tube 3, a nut 25 having a center aperture and disposed in fitting 24, two brackets 26, a metallic sleeve 27 preferably composed of either titanium or zirconium and supported by the brackets 26 more or less concentrically inside the pressure jacket 14. Inside the sleeve 27 is disposed a heating filament 28 which is connected electrically, by the insulated conductor 29, to a source of controllable current (not depicted). The heating filament 28 is connected to reference potential (ground) by way of the top bracket 26, the metallic sleeve 27, the bottom bracket 26, the nut 25, the pressure jacket 14, the fitting 24, and the accelerator tube wall (not shown in FIG. 3).

FIG. 4 shows a cutaway pictorial view of the metallic sleeve 27 exposing the heating filament 28 for the purpose of showing how, in a preferred form of the present invention, the heating filament 28 provides substantially uniform heating throughout the length of the sleeve 27. As shown, a sleeve 27 which has a uniform wall thickness throughout its length will be heated to substantially a uniform temperature throughout save for the heat loss at its ends due to the conductivity of the metallic brackets 26.

FIG. 5 shows apparatus for processing an accelerator tube 3 in accordance with the present invention including a controllable heating filament power supply 42 connected by means of the aforementioned insulated conductor 29 to the heating filament 28 in the pressure jacket 14. Also shown is a power supply 39 for energizing the suppressor rings 11, a power supply 40 for the ionization gage tube 41 which measures the pressure of the tube 3 atmosphere 5, an external deuterium supply 30 and control valve 31, a Pirani gage tube 36 and power supply 37, a Phillips ionization gage tube 33 and its associated power supply 32, a pumping system 34 and control valve 35, and tube atmosphere control valve 38.

In using the apparatus shown in FIG. 5, it is necessary to first prepare the sleeve 27 shown in FIGS. 3 and 4 by loading it with relatively pure deuterium. This is preferably accomplished by first selecting a tube, of the desired metal, in this case titanium or zirconium, having the desired diameter and wall thickness; and heating it in a vacuum and at a temperature sufficient to drive out many foreign substances (principally hydrogen). The most satisfactory temperature will preferably be that just below the melting point of the metal. The purified titanium tube is then cooled in the vacuum (the exhausted impurities being pumped away) to about 150° centigrade. Thereafter, relatively pure deuterium is admitted to the heating chamber at a pressure of about one atmosphere, and the titanium tube is permitted to cool to room temperature. Thereafter, a sleeve 27 of the proper length may be cut from the deuterium impregnated titanium tube and then assembled as shown in FIGS. 2, 3 and 5, with minimum contamination from the atmosphere.

The first step in the preferred procedure for processing an accelerator tube 3, to establish a proper internal atmosphere 5, comprises reducing this atmosphere 5 to a pressure of approximately $5 \times 10^{-5}$ mm. Hg by means of the pumping system 34 while heating the tube 3 and associated piping to about 250° Fahrenheit. Next, the accelerator tube 3 and the ionization gage 41 should be energized, and deuterium from the deuterium supply 30 should be admitted to the tube 3 while the pumping system 34 holds the tube 3 atmosphere 5 to a pressure of about $5 \times 10^{-3}$ mm. Hg. This step should be continued for about two or three hours. The anode 4 and cathode 9 may be energized during this period to draw current and thereby aid clean-up of the tube 3.

At the termination of the clean-up period, the control valve 31 should be closed to cut off the deuterium supply 30, and the tube should be pumped to minimum pressure. Thereafter, the entire system should be permitted to cool to room temperature, and the pumping system 34 should continue to pump the tube 3 for about one additional hour. Next, the tube atmosphere control valve 38 should be closed to seal the tube 3, and a pre-selected reference current from the filament power supply 42 should be applied to the heating filament 28 in the pressure jacket 14. If the apparatus is constructed in conformance with the geometry hereinafter described, a satisfactory reference current will be a current of about 220 milliamps at about 23 volts. The precise value of the pre-selected reference current is not critical, but to be satisfactory, the selected current must be such that it is substantially less than the current necessary to raise the sleeve 27 to melting temperature, but sufficient to heat at least a portion of the sleeve 27 to a temperature at which oxygen, nitrogen, and other such impurities are continuously gettered (absorbed). Under these circumstances, the pressure of the deuterium atmosphere 5, in the tube 3, will rise well above the pre-selected optimum pressure since the heated sleeve 27 will desorb deuterium in amounts related to the temperature of the sleeve 27 and the pressure of the deuterium atmosphere 5. Next, the tube atmosphere control valve 38 should be opened, and excess deuterium should be pumped away until the tube atmosphere 5 stabilizes at the desired operating pressure while the pre-selected reference current is applied to the heating filament 28 in the sleeve 27. To test the condition of the tube atmosphere 5, it is only necessary to close the tube atmosphere control valve 38 and thereafter to observe any deviations of pressure occurring while the reference current heats the deuterium impregnated sleeve 27. If deviations occur, the tube atmosphere control valve 38 should be re-opened, and deuterium added to or removed from the tube atmosphere 5 as necessary, while applying the pre-selected reference current to the heating filament 28. To check whether the sleeve 27 is functioning adequately, one may re-seal the tube 3 and decrease the filament 28 current in increments of about 5 milliamps to achieve a decrease in pressure of the tube atmosphere 5. For the previously mentioned geometry, a filament 28 current of 170 milliamps should produce a tube atmosphere 5 pressure of about $5 \times 10^{-5}$ mm. Hg. If, on the other hand, the filament 28 current is increased to 300 milliamps, the tube atmosphere 5 pressure should rise to a pressure of an order of 1 mm. Hg. If, when the filament 28 current is returned to reference (220 milliamps for the suggested geometry), and the tube atmosphere 5 pressure returns to the desired operating pressure, the tube 3 has been properly processed and may be sealed by cold welding. If the tube atmosphere 5 pressure fails to return to the pressure desired, add or remove deuterium as necessary, and then repeat the tests.

Returning to FIG. 2, first assume a de-energized tube 3 which has been properly prepared by the foregoing process, and which has an internal volumetric dimension of approximately one-half of a liter. Next, if a current of about 250 milliamps at 28 volts is applied to a heating filament 28 disposed as shown in FIG. 4 in a titanium sleeve 27 having dimensions of approximately 1¼ in. x ⅛ in. O.D. x 0.01 in. wall thickness, at least a part (generally the center section) of the sleeve 27 in the pressure jacket 14 will be heated to a peak of around 900° centigrade, and at least another part or section will be heated to about 650° centigrade. This current may be supplied by a controllable source of filament current such as that shown in FIG. 5, or may be supplied by the difference amplifier 20 and power amplifier 22 shown in FIG. 2. If that form of the present invention depicted in FIG. 2 is used, the two amplifiers, being adjusted to supply filament current generally inversely proportional to the magnitude of the suppressor ring 11 current, will automatically apply a maximum current since the tube 3 is de-energized. When heated in the foregoing manner, the sleeve 27 will absorb and retain (unless heated to temperatures approaching the melting point of the metal) substantially all such "permanently absorbable" impurities while also simultaneously emitting deuterium. Now, if the tube 3 is energized and the deuterium atmosphere 5 is too dense, the current in the suppressor ring 11 circuit will rise above its characteristic optimum which may be, for example about one microamp. This will cause the difference amplifier 20 and power amplifier 22 to reduce the current to the heating filament 28 proportionately, to reduce the temperature of the sleeve 27 and thereby curtail the deuterium desorption into the tube atmosphere 5 (or commence absorption if necessary) to adjust the pressure as desired. (It is desirable to maintain at least a part of the titanium sleeve 27 at approximately 900° centigrade to remove impurities occasionally appearing.) If the current to the heating filament 28 is supplied by a controllable source such as that shown in FIG. 5, then the logging operation will, of course, select the proper current in accordance with the pressure indication provided by the suppressor ring 11 current as shown by the indicator 15. As previously described and explained, the filament 28 required to stabilize the deuterium atmosphere 5 at the desired optimum pressure (assuming no extremes in ambient temperature) will be the pre-selected reference current previously mentioned. For a tube 3 and sleeve 27 of the geometry heretofore described, this reference current is preferably 220 milliamps at about 23 volts. At this point, the sleeve 27 will continue to absorb impurities as they occur, and will continue to simultaneously absorb and desorb deuterium in equal volumes in a state of equilibrium as long as the tube atmosphere 5 remains at the pre-selected optimum pressure. If the pressure drops, a related decrease in suppressor ring 11 current will either indicate to the logging operator that he should increase the filament 28 current, or if the invention is in the form shown in FIG. 2, the ring 11 current decrease will cause the difference and power amplifiers 20 and 22 to proportionally increase the filament 28 current. Of course, the average accelerator tube 3 is so designed that the occurrence of impurities will cause a change in the magnitude of the suppressor ring 11 current even though the tube atmosphere 5 pressure remains at optimum. Thus, the ring 11 current should preferably be compared with a pressure measurement from another indicator in order that the cause of a drop in neutron output may be correctly identified. However, since the sleeve 27 continuously absorbs impurities any changes in suppressor ring 11 current may safely be attributed to changes in pressure of the deuterium atmosphere 5.

Another form of the present invention, which has been found extremely useful for most logging purposes, is the use of the apparatus shown in FIGS. 3 and 4 together with a constant current power supply which applies the pre-selected reference current to the heating filament 28. With a continuous current of this magnitude, the sleeve 27 will be constantly maintained at the temperature established by the previously described processing to establish equilibrium of deuterium sorption at the pre-selected optimum atmosphere 5 pressure. Assuming no tube 3 malfunctions due to other causes, the only significant changes in operating conditions will be changes in ambient temperature in the borehole. However, since the pre-selected reference current applied continuously to the heating filament 28 is of a magnitude such that the sleeve 27 is always at a gettering temperature, only the most extreme ambient temperatures will produce a significant change in the temperature of the sleeve 27.

It should be understood that, except in the case of a de-energized accelerator tube 3, the suppressor ring 11 current will never disappear entirely no matter how pure the deuterium atmosphere 5 may become, and no matter how closely optimum pressure may be approached. Moreover, the fluctuation of the ring 11 current is only proportional to the fluctuation of the pressure over a reasonable operating range. Therefore, in that form of the present invention chosen for purposes of illustration in FIG. 2, the difference amplifier 20 should be adjusted to provide filament 28 current having a maximum and minimum limit. For equipment and apparatus having the aforementioned dimensions and geometry, convenient limits have been established at 150 and 300 milliamps at about 15 volts to 35 volts.

The precise shape of the titanium sleeve 27 is not significant to the concept of the present invention. However, it should be emphasized that sleeve 27 shape and wall thickness, heating filament 28 shape and disposition in or next to the sleeve 27, and the magnitude of current applied to the heating filament 28, are all factors governing the sorption characteristics of the sleeve 27. As hereinbefore stated, it is preferable that the sleeve 27 have generally a uniform wall thickness. Thus, a heating filament 28 disposed therein as shown in FIG. 4 will tend to apply heat uniformly along the length of the sleeve 27. Due at least partly to the conductive action of the support brackets 26, this will tend to create a temperature gradient along the length of the sleeve 27, wherein the hottest zone will be generally in the center section. The temperature at this hot section of the sleeve 27 should be preferably that sufficient to absorb those atmospheric constituents other than hydrogen and its isotopes (approximately 900° C.), and should lessen progressively in each direction as the ends are approached. Thus, stabilization of the tube atmosphere 5 will be at least partly due to the cycling action which tends to occur under optimum conditions, wherein the deuterium tends to enter the sleeve 27 ends in greater amounts than it tends to enter the warmer sections, and to flow along the sleeve 27 from cooler to warmer areas, where it tends to leave these areas in amounts greater than it enters. At the sought-for tube pressure the cycle will be in balance and, small changes in tube pressure may be more easily corrected by the resulting unbalance. Obviously this is a great improvement, performance-wise, over a uniformly heated sleeve 27, or over the prior art which utilized two uniformly-heated sorption filaments (instead of sleeves 27) wherein one filament is saturated to capacity and the other is outgassed. In such an arrangement the pressure sensing and signalling apparatus is increasingly complex, and can never be dispensed with as in that form of the present invention wherein the heating filament 28 is subjected to merely the constant pre-selected reference current hereinbefore described.

It should be understood that the term "permanently absorbable," as used herein in reference to tube atmospheric impurities other than hydrogen and its isotopes, is intended to be used in a relative sense. It is well known that there are processes available for removing so-called "permanently" absorbed impurities from the metal. However, since it is neither desirable nor necessary to use such processes for practicing or using the present invention, the impurities may be considered permanently absorbed.

Although the forms of the present invention, as depicted and described herein, are directed to the control of an accelerator tube having a deuterium atmosphere, it is obvious that the present invention is capable of a much wider application. Not only is it suitable for use in any type of high vacuum electric discharge tube having an internal atmosphere composed of any isotope of hydrogen, but it may be embodied in many variations of the apparatus and methods described herein. For example, the sorption reservoir may be heated directly by the current now applied to the heating filament 28 circuit. Numerous other variations and modifications may be made without departing from the principle of the invention. Accordingly, it should be understood that the forms of the invention depicted and described herein are illustrative only, and are not intended to be the limits of the present invention.

What is claimed is:

1. In an electric discharge tube having an internal atmosphere composed substantially of a pre-selected gas selected from the group composed of hydrogen and its isotopes, in combination therewith a metallic sorption means disposed in contact with said atmosphere and containing to the relative exclusion of other subsances an amount of said gas many times greater than the amount of said gas in said atmosphere, and means causing said sorption means to absorb from said atmosphere substances other than said gas and to exchange with said atmosphere relative amounts of said gas functionally related to the pressure of said atmosphere.

2. In an electric discharge tube having an internal atmosphere composed substantially of deuterium, in combination therewith a metallic body impregnated with deuterium to the relative exclusion of other substances and in an amount many times greater than the amount of deuterium in said atmosphere, and means for heating at least a part of said body in a manner and to a temperature such that said body absorbs impurities from said atmosphere and simultaneously exchanges deuterium with said atmosphere in relative amounts functionally related to the pressure of said atmosphere.

3. In an electric discharge tube having an internal atmosphere composed substantially of deuterium, in combination therewith a metallic body impregnated with deuterium to the relative exclusion of other substances and in an amount many times greater than the amount of deuterium in said atmosphere, and pressure-responsive means for heating at least a part of said body in a manner and to a temperature such that said body absorbs impurities from said atmosphere and exchanges deuterium with said atmosphere in relative amounts functionally related to the pressure of said atmosphere.

4. In an electric discharge tube having an internal atmosphere composed substantially of deuterium, said tube having at least one electrode disposed adjacent said atmosphere and conducting an electric current of a magnitude monotonically related to the pressure of said atmosphere, in combination therewith a metallic body impregnated to the relative exclusion of other substances with an amount of deuterium many times greater than the amount of deuterium in said atmosphere, said impregnated body being disposed in a manner such that said body exchanges deuterium with said atmosphere in relative amounts functionally related to the temperature of said body and the pressure of said atmosphere, and means responsive to said electric current for heating at least a part of said body to maintain said atmosphere at a pre-selected pressure substantially to the exclusion of substances other than deuterium.

5. In an electric discharge tube having an internal atmosphere composed substantially of a gas selected from the group consisting of hydrogen and its isotopes, said tube having at least one electrode disposed adjacent said atmosphere and conducting an electric current of a magnitude predictably related to the pressure and purity of said atmosphere, in combination therewith a single metallic body impregnated with said gas to the relative exclusion of other substances foreign to said body, said body being disposed in a manner such that said body absorbs impurities from said atmosphere and also exchanges with said atmosphere relative amounts of said gas functionally related to the pressure of said atmosphere and temperature of said body, and means responsive to the magnitude of said current for selectively heating at least a part of said body to maintain said atmosphere at a pre-selected pressure substantially to the exclusion of substances other than said gas.

6. In an electric discharge tube having an atmosphere composed substantially of deuterium, in combination therewith a single titanium tubular member impregnated with an amount of relatively pure deuterium and disposed so as to absorb impurities from said atmosphere and to exchange deuterium with said atmosphere in amounts functionally related to the pressure of said atmosphere and to the temperature of said member, and heating means adjacent said member for heating said member to a temperature such that said member exchanges substantially equal amounts of deuterium with said atmosphere at a pre-selected atmospheric pressure.

7. In an electric discharge tube having an atmosphere composed substantially of deuterium, in combination therewith a single metallic body disposed adjacent said atmosphere, a quantity of deuterium disposed in said body to the relative exclusion of other substances and having a magnitude many times greater than the quantity of deuterium in said atmosphere but substantially less than the quantity of deuterium which said body is capable of holding, and means for heating at least a part of said body to a pre-selected temperature.

8. In an electric discharge tube having an atmosphere composed substantially of deuterium, in combination therewith a metallic body disposed adjacent said atmosphere, a quantity of deuterium disposed in said body to the relative exclusion of other substances and having a magnitude many times greater than the quantity of deuterium in said atmosphere but substantially less than the quantity of deuterium which said body is capable of holding, and means for heating at least a part of said body to a temperature such that said body absorbs permanently absorbable impurities from said atmosphere and also exchanges with said atmosphere relative volumes of deuterium functionally related to the pressure of said atmosphere.

References Cited in the file of this patent

UNITED STATES PATENTS

| | | |
|---|---|---|
| 1,661,436 | McCullough | Mar. 6, 1928 |
| 2,882,117 | Bruining et al. | Apr. 14, 1959 |
| 2,908,823 | Ely | Oct. 13, 1959 |
| 2,919,368 | Goldberg et al. | Dec. 29, 1959 |
| 2,951,945 | Goodman | Sept. 6, 1960 |